No. 744,108. PATENTED NOV. 17, 1903.
R. A. REHNER.
NUT LOCK.
APPLICATION FILED JULY 18, 1903.
NO MODEL.
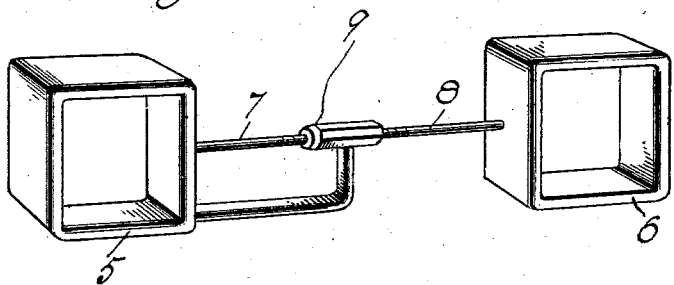
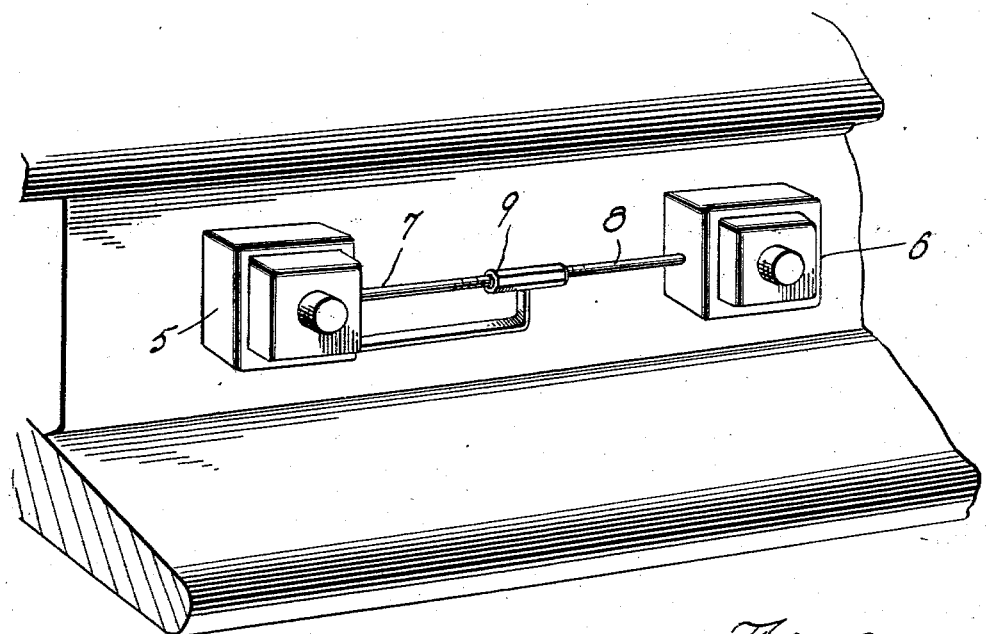
Witnesses
Inventor
R. A. Rehner
Attorneys No. 744,108. Patented November 17, 1903.

UNITED STATES PATENT OFFICE.

RICHARD A. REHNER, OF LACON, ILLINOIS.

NUT-LOCK.

SPECIFICATION forming part of Letters Patent No. 744,108, dated November 17, 1903.

Application filed July 18, 1903. Serial No. 166,128. (No model.)

*To all whom it may concern:*

Be it known that I, RICHARD A. REHNER, a citizen of the United States, residing at Lacon, in the county of Marshall, State of Illinois, have invented certain new and useful Improvements in Nut-Locks; and I do hereby declare the following to be a full, clear, and exact description of the invention, such as will enable others skilled in the art to which it appertains to make and use the same.

This invention relates to nut-locks, and more particularly to that class employed where a pair of nuts on separate bodies are to be locked, as when employed in connection with fish-plates for railway-rails.

The object of the invention is to provide a construction which will lock one nut from the other, which will be efficient in its operation, and which may be easily and quickly applied and removed.

In the drawings forming a portion of this specification, and in which like numerals of reference indicate similar parts in both views, Figure 1 is a perspective view of the lock. Fig. 2 is an elevation showing the nuts of two bolts with the lock thereon, the bolts being engaged through a rail.

Referring now to the drawings, the present lock comprises two angular frames which are adapted to engage over the nuts, such frames being shown at 5 and 6. The frames are fitted upon the nuts so that their sides are in contact with side faces of the nut. Projecting from corresponding sides of the frame are stems 7 and 8, which when the frames are in use aline, and the free ends of these stems are threaded and have a cross-sectionally angular turnbuckle 9 engaged therewith, so that when the turnbuckle is adjusted the frames will be moved toward or away from each, and by thus impinging the outer sides of the frames against the nuts said frames will be held against accidental removal from the nuts, and when the frames are in place it will be understood that neither nut will be rotated.

To hold the turnbuckle against rotation, a spring-finger is formed upon or secured to the frame 5 and has its free end bent laterally and disposed against the turnbuckle, against which it bears with sufficient pressure to prevent rotation. When a wrench is engaged with the turnbuckle and force applied to the latter, the spring-finger will yield to a sufficient extent to permit of rotation of the turnbuckle.

What is claimed is—

A nut-lock comprising angular frames having stems which are screw-threaded at their free ends, a turnbuckle engaged with the threaded ends of the stem, and a spring-finger secured to one of the frames and bearing with its free end yieldably against the turnbuckle, the latter being angular in cross-section.

In testimony whereof I affix my signature in presence of two witnesses.

RICHARD A. REHNER.

Witnesses:
R. M. BARNES,
JAY H. MAGOON.